United States Patent Office 2,742,345
Patented Apr. 17, 1956

2,742,345
PROCESS FOR THE PRODUCTION OF FINELY DIVIDED SILICATES OF LOW DENSITY

Harry Kloepfer and Artur Frey, Frankfurt am Main, Gerhard Weitbrecht, Neu-Isenburg, and Hans Kohl, Frankfurt am Main, Germany, assignors to Deutsche Gold- und Silber-Scheideanstalt vormals Roessler, Frankfurt am Main, Germany No Drawing. Application July 9, 1954, Serial No. 442,438

Claims priority, application Germany July 22, 1953

5 Claims. (Cl. 23—110)

The present invention relates to an improved process for the production of finely divided silicates of low density from natural silicates, such as, clays of the kaolin type and bentonites, and is especially adapted to the production of finely divided products of low bulk density from the swellable bentonites.

It has already been proposed to employ natural materials, such as, clay, kaolin and the like, as fillers for rubber and other elastomers. However, it was found that the activity of such materials, in general, is not sufficient to produce products of quality. The natural silicates have also only had limited utility in other connections where fine subdivision or active properties are required, for example, in catalysis and absorption, because of their relatively coarse grain size.

It has now been found, according to the invention, that natural silicates can be transformed into products of unexpectedly fine grained nature and of considerable activity, in a comparatively simple manner by heating aqueous suspensions of natural silicates under pressure in the presence of calcium hydroxide. Especially good results can be obtained upon treatment of aluminum silicates of the type of kaolins, Halloysite, and other clay minerals, and particularly in the treatment of bentonites (preferably of the montmorillonite type). It is known that bentonites have swelling properties, but the swelling is reversible and disappears upon removal of the swelling agent, such as, for example, water, so that the poured and shaken weight of the dry material remains unchanged. It was unexpectedly found that, when bentonites are treated under pressure with lime by the process according to the invention, products can be obtained which, when dried, have a considerably lower poured or shaken weight than the original bentonites treated. The poured or shaken weight of the treated material being only about one-tenth of that of the original material.

The properties of the products obtained in accordance with the invention indicate that the lime entering into the reaction was chemically bound. For example, the pH of the products obtained is near 7. The best results in the treatment of swellable natural silicates are obtained when the quantity of calcium hydroxide employed is such that it is 15–60%, and preferably 20–40% (calculated as CaO), by weight of the silicate treated.

In carrying out the process according to the invention, the treatment of the natural silicates is effected in a closed vessel at temperatures above the boiling point of the aqueous suspension treated, and preferably temperatures of 150–250° C., and under the elevated pressures attained at such temperatures. The length of treatment required depends upon the temperature employed. At a temperature of 200° C., products of excellent fineness of grain are obtained after only a few hours. If lower temperatures of, for example, 150–170° C. are employed, it is necessary to lengthen the time of treatment in order to obtain products of the same good properties. As a rule, good results can be obtained at temperatures of 160–190° C. in the treatment of bentonites.

In accordance with a special modification of the process according to the invention, the lime treated natural silicates can subsequently be subjected to an extraction with acid to remove some or all of the bound lime. Such extraction has been found to be of advantage in certain uses of the treated products. For example, it was found that acid extraction of lime treated kaolin results in an especially loose product which, when employed in compounding rubber, produces especially abrasion resistant products. In carrying out the acid extraction of the lime treated products according to the invention, it is advantageous if the acidity of the extracting medium is not below a pH of about 4–5, as strong acids have a tendency to decompose the products. It is most surprising that the extraction of the lime from the lime treated reaction products, and especially the lime treated bentonites, does not greatly increase the bulk density of the products.

The following examples will serve to illustrate several modifications of the present invention.

Example 1

200 g. of bentonite were added to 60 g. of calcium oxide in the form of slaked lime and 1500 cc. of water and the suspension thoroughly mixed in a ball mill. The resulting mixture was introduced into an autoclave and heated therein for three hours while stirring at a temperature of about 180° C. The reaction product was filtered off under suction and dried at temperatures over 100° C. The shaken weight of the product was 120 g. per liter, whereas the shaken weight of the original bentonite was 1138 g. per liter. An investigation of the product indicated that about 5% of the lime was not bound and this could be removed by fractional extraction with dilute HCl. The thus refined produce had a pH of 7 after drying.

The analysis of original bentonite was as follows:

| | Per cent |
|---|---|
| $SiO_2$ | 63.9 |
| $Al_2O_3$ | 12.3 |
| $Fe_2O_3$ | 3.9 |
| $CaO$ | 1.7 |
| $MgO$ | 2.9 |
| $Na_2O$ | 1.7 |
| Loss on ignition | 13.2 |

Example 2

200 g. of bentonite of the same analysis as in Example 1 and 60 g. of calcium oxide in the form of slaked lime were stirred into 1 liter of water and the mixture was ground for 24 hours in a ball mill. After sufficient water was added to the ground product to increase its volume to 3 liters, it was placed in an autoclave and heated for 2 hours at 250° C. A gauge pressure of about 39 atmospheres was attained during the autoclaving. The solid reaction product was separated from the liquid and was dried at about 110° C. The poured weight of the product was 40 g. per liter and its shaken weight was 108 g. per liter.

Example 3

600 g. of clay were ground together with 326 g. of calcium oxide in the form of slaked lime in 5 liters of water for 24 hours in a ball mill. After addition of a sufficient quantity of water to increase its volume to 10 liters, the mixture was autoclaved for 3 hours at 160° C. During the autoclaving, a gauge pressure of about 16 atmospheres was attained. After drying the solid finely divided reaction product, it had a poured weight of 66 g. per liter and a shaken weight of 190 g. per liter, whereas the corresponding weights of the original clay were 970 g. per liter and 1350 g. per liter. When 20% of the CaO content of the reaction product was extracted with dilute HCl, it had a shaken weight of 140 g. per liter, when 60% of the CaO content was extracted, it had a shaken weight of 159 g. per liter, and when all of the CaO was extracted, it had a shaken weight of 226 g. per liter which is still considerably less than that of the untreated clay.

The main constituents of the original clay were as follows:

|  | Per cent |
|---|---|
| $SiO_2$ | 64.4 |
| CaO | 8 |
| $Al_2O_3$ | 8 |
| $Fe_2O_3$ | 3.8 |

Example 4

200 g. of Klingenberg clay were ground with 109 g. of CaO in 1 liter of water for 24 hours. After addition of sufficient water to increase its volume to 3 liters, the mixture was autoclaved for 3 hours at 200° C. The gauge pressure attained during autoclaving, as in Example 3, was about 16 atmospheres. The shaken weight of the dried reaction product was 270 g. per liter, whereas the untreated Klingenberg clay had a shaken weight of 1170 g. per liter.

The analysis of the untreated Klingenberg clay was

|  | Per cent |
|---|---|
| $SiO_2$ | 50.2 |
| $Al_2O_3$ | 33.4 |
| $Fe_2O_3$ | 1.5 |
| CaO | 0.7 |
| Alkali metal oxide | 1.0 |
| Ignition loss | 13 |

The utility of the loose products of low bulk density obtained according to the invention is not limited to use as fillers for elastomers. The products can also advantageously by used for a wide variety of other purposes. For example, they can be employed as thickeners for aqueous and non-aqueous liquids, except strong acids. The thickening effect depends upon the quantity used and liquids can be converted to viscous fluids to hard pastes by addition of suitable quantities of the products. The products, for instance, can be added to lubricating oils to convert them into consistent lubricating greases. When further quantities of the silicate products obtained according to the invention are added to pasty compositions produced with such silicates, dispersible free flowing powdery compositions can be obtained which can, for example, be employed in the production of insecticidal dusts. The silicate products, according to the invention, are also useful as milling assistants when milling materials, such as, waxy substances, which tend to clog the mills.

The silicates according to the invention furthermore have been found to have excellent decolorizing action on oils and produce good results with only a fraction of the quantity necessary when untreated silicates are employed.

The silicates according to the invention furthermore can be used in the paint and lacquer industry, for example, to retard sedimentation of pigments. They also can be used as carriers for medicines, for example, in the production of tablets. They also can be used in ceramics, for example, in the production of enamels, glazes and ceramic colors, because of their good reactivity and ability to stabilize suspensions which tend to settle out. In view of the low bulk density of the treated silicates, they also can serve as good insulating materials. Furthermore, they have been found to be good mild abrasives and polishing agents for use in optics and toothpastes.

We claim:

1. A process for converting a bentonite which is swellable in water into a finely divided product of low bulk density which comprises autoclaving an aqueous suspension of such bentonite with calcium hydroxide at a temperature between 150 and 250° C. to effect a reaction between the suspended bentonite and the calcium hydroxide.

2. A process according to claim 1 in which such equeous suspension containing the silicate and calcium hydroxide is wet ground before autoclaving.

3. A process according to claim 1 comprising in addition extracting the autoclaved reaction product with an acid medium having a pH of at least 4.

4. A process according to claim 1 in which the quantity of said calcium hydroxide calculated as CaO is 15 to 60% of the weight of the bentonite.

5. A process according to claim 1 in which the quantity of said calcium hydroxide calculated as CaO is 20 to 40% of the weight of the bentonite.

References Cited in the file of this patent

UNITED STATES PATENTS

| 2,141,132 | Folger | Dec. 20, 1938 |
| 2,534,303 | Serinis | Dec. 19, 1950 |
| 2,665,996 | Kalousek | Jan. 12, 1954 |

FOREIGN PATENTS

| 268,011 | Great Britain | Mar. 18, 1927 |